US006932555B2

(12) United States Patent
Dale et al.

(10) Patent No.: US 6,932,555 B2
(45) Date of Patent: Aug. 23, 2005

(54) MULTI-PURPOSE LOAD BEARING ASSEMBLY FOR ALL TERRAIN VEHICLE (ATV)

(76) Inventors: Peter Dale, R.R. #2, 1660 Highway 11 North, Kilworthy, Ontario (CA), P0E 1G0; Luc Belzile, 61 Allee Pointe du Jour, Petit-Shippagan, New Brunswick (CA), E8T 2Z4

( * ) Notice: Subject to any disclaimer, the term of this patent is extended or adjusted under 35 U.S.C. 154(b) by 13 days.

(21) Appl. No.: 10/270,288

(22) Filed: Oct. 15, 2002

(65) Prior Publication Data

US 2003/0235490 A1 Dec. 25, 2003

Related U.S. Application Data

(60) Provisional application No. 60/389,921, filed on Jun. 20, 2002.

(51) Int. Cl.[7] ..................... B65G 9/00

(52) U.S. Cl. ..................... 414/607; 187/226

(58) Field of Search ..................... 414/607, 917, 414/920, 629, 673, 642; 187/226, 232, 233

(56) References Cited

U.S. PATENT DOCUMENTS 4,023,690 A 5/1977 Goode
4,128,179 A 12/1978 Gilbert
4,177,001 A * 12/1979 Blackwood ............ 414/628
4,277,008 A 7/1981 McCleary
4,325,666 A * 4/1982 Chain et al. ............ 414/24.5
4,397,607 A 8/1983 Neill, Jr. et al.
4,467,558 A 8/1984 Rathman
4,615,130 A 10/1986 Racicot
4,640,662 A * 2/1987 Spellman, Jr. ............ 414/642
5,232,055 A * 8/1993 Van Vuuren ............ 172/318
5,312,218 A * 5/1994 Pratt et al. ............ 414/10
5,590,998 A * 1/1997 Wilcox ............ 414/607
5,951,236 A * 9/1999 Thompson ............ 414/607
6,099,234 A * 8/2000 Mason ............ 414/607
6,155,771 A 12/2000 Montz
6,234,741 B1 5/2001 McDaniel
6,312,210 B1 11/2001 Lang
6,343,674 B1 * 2/2002 Sexsmith ............ 187/222
6,543,566 B1 * 4/2003 Mason ............ 180/209

* cited by examiner

*Primary Examiner*—Richard Ridley
(74) *Attorney, Agent, or Firm*—Ridout & Maybee LLP

(57) ABSTRACT

An support structure is provided comprising: (a) a mast extending upwards; (b) a center bar extending horizontally from the mast, the center bar configured to extend along the bottom of the light vehicle; (c) a T bar extending from the center bar, along the bottom of the light vehicle to a T bar end at a lateral side of the light vehicle; and (d) a first truss member extending upwards on an incline from the first T bar end to a truss position on the mast. A counter load bearing mount may be attached to the center bar at the second end of the vehicle. Also taught is a load bearing apparatus comprising a support structure of the invention and at least one load bearing member selected from the group consisting of a dump box, 3-point hitch, hitch, dump bucket, log skidder, pallet forks, backhoe, agricultural plow, folding forks, tiller, scraper, disk harrow, disk harrow, hydraulic hammer, auger, grinder, and grapples.

16 Claims, 9 Drawing Sheets

MULTI-PURPOSE LOAD BEARING ASSEMBLY FOR ALL TERRAIN VEHICLE (ATV)

CROSS-REFERENCE TO RELATED APPLICATION

This application claims priority from U.S. Patent Application Ser. No. 60/389,921 filed Jun. 20, 2002 and currently pending. The entire disclosure of that application is incorporated herein by reference.

FIELD OF THE INVENTION

The invention relates to load bearing assemblies, digging assemblies and support structures for load bearing assemblies and digging assemblies, for all terrain vehicles (ATVs).

BACKGROUND OF THE INVENTION

Small business owners, handymen, contractors, landscapers, farmers and others often need equipment for lifting, hauling and transporting heavy objects. Fork lifts and other load bearing apparatus designed for this purpose are expensive. Devices which attach to vehicles to form a fork lift or other load bearing apparatus are generally complicated in structure and limited in usefulness.

All-terrain vehicles are becoming increasingly popular and most are constructed for carrying one or two persons, but little provision has been included to enable an all-terrain vehicle to tow, lift, carry bulky loads, or operate digging equipment.

In addition, those vehicles (other than full size passenger vehicles) which may be operated under off-road conditions usually are not provided with adequate supporting structure for attaching conventional towing or load carrying structures thereto.

U.S. Pat. No. 6,155,771 to Montz teaches an ATV with a winch operated hoist connected to the back of the ATV. Montz uses a stabilizing foot attached to a stabilizing bar which can be raised and lowered to engage or disengage the stabilizing foot with the ground. Montz does not teach or suggest a forklift, nor does Montz teach or suggest the support apparatus that can be used while the ATV is in motion and without pausing to manually adjust the stabilizing apparatus.

U.S. Pat. No. 5,951,236 to Thompson teaches a forklift operated by a winch and attachable to the front end of a vehicle, such as a jeep. Thompson teaches a sturdy, heavy support structure attachable to the front end of a jeep. Due to the relatively light weight of an ATV, the structure of Thompson would not be practical for use in conjunction with an ATV, as the weight of the forklift, with or without a load, would unbalance an ATV.

U.S. Pat. No. 6,312,210 to Lang teaches a hauling accessory for an ATV. The accessory is meant for hauling light weight cargos.

The prior art teaches numerous other forklift and forklift like assemblies for attachment to vehicles. For example, U.S. Pat. No. 4,023,690 to Goode, U.S. Pat. No. 4,128,179 to Gilbert and U.S. Pat. No. 6,234,741 to McDaniel, which are for use in association with a flat bed truck.

U.S. Pat. No. 4,277,008 to McCleary teaches a load bearing rack for attachment to the rear of an all terrain vehicle.

U.S. Pat. No. 4,467,558 to Rathman teaches a herbicide applying apparatus for use in association with the front end of an ATV. Rathman's design would only appear to be operable with a three wheel ATV.

U.S. Pat. No. 4,615,130 to Racicot teaches a snowplow blade for attachment to an ATV.

U.S. Pat. No. 4,397,607 to Neill, Jr. et al. teaches a winch apparatus for attachment to the rear of a vehicle. The invention of Neill, Jr. et al. would not work with an ATV.

What is needed is a device for attaching to a vehicle to form a fork lift and other load bearing apparatus which is versatile and simple in construction.

SUMMARY OF THE INVENTION

The present invention provides a support structure for a load bearing apparatus for a light vehicle, comprising: (a) a mast extending upwards; (b) a center bar extending horizontally from the mast, the center bar configured to extend along the bottom of the light vehicle; (c) a T bar extending from the center bar, along the bottom of the light vehicle to a T bar end at a lateral side of the light vehicle; and (d) a first truss member extending upwards on an incline from the first T bar end to a truss position on the mast.

The mast may have a first mast post and a second mast post, wherein the T bar has a second T bar end at an opposite lateral side opposite the lateral side of the light vehicle; and the first truss member extends upwards on an incline from the first T bar end to the first mast post and a second truss member extends upwards on an incline from a second T bar end to the second mast post. The mast may be pivotable in relation to the center bar and wherein at least one end of the first truss member is releasably attachable to more than one location such that the mast may be secured to the T bar at more than one angle in relation to the center bar.

The mast may be configured for positioning at a first end of the vehicle and the center bar extends from the mast to a second end of the vehicle and the center bar is configured to be releasably secured to the second end of the vehicle.

A counter load bearing mount may be attached to the center bar at the second end of the vehicle. The first end of the vehicle may be the rear of the vehicle, or it may be the front of the vehicle.

The invention also teaches a load bearing apparatus comprising a winch and a support structure of the invention. The invention further teaches a load bearing apparatus comprising a support structure of the invention and at least one support member secured in a relation substantially perpendicular to the mast and slidable in parallel relation to the mast, a winch and a winch line, and wherein the at least one support member is secured to the winch line such that the operation of the winch moves the at least one support member in parallel relation to the mast.

The invention further teaches a load bearing apparatus comprising a support structure of the invention and at least one load bearing member selected from the group consisting of a dump box, hitch, dump bucket, log skidder, pallet forks, backhoe, agricultural plow, folding logging forks, tiller, and disk harrow. The support member may be secured in a relation substantially perpendicular to the mast, and wherein the load bearing member is releasably attachable to the support member.

The invention also teaches a support structure for a load bearing apparatus for a light vehicle, comprising: (a) a mast configured for positioning at a first end of the vehicle and extending upwards; (b) a center bar extending horizontally from the mast, the center bar configured to extend along the bottom of the light vehicle to a second end of the vehicle and the center bar is configured to be releasably secured to the second end of the vehicle; and (c) a load bearing apparatus attached to the center bar at the second end of the vehicle. There may be a truss member extending from substantially a bottom of the all terrain vehicle upwards to the mast.

The invention further teaches a forklift comprising a mast, at least one support member slidable in relation to the mast, a winch and a winch line for sliding the support member in relation to the mast, and carrying arms extending substantially horizontally from the support member, wherein the carrying arms are pivotable such that they may be pivoted downwards to a substantially vertical, load bearing position and alternatively pivoted upright to a substantially horizontal position.

The invention also teaches, in combination, an all terrain vehicle and a forklift, the forklift comprising a mast, at least one support member slidable in relation to the mast, a winch and a winch line for sliding the support member in relation to the mast, and carrying arms extending substantially horizontally from the support member. The counter load bearing mount may be attached to an end of the all terrain vehicle which is located opposite the forklift. A truss member may extend from substantially the bottom of the all terrain vehicle upwards to the mast.

BRIEF DESCRIPTION OF THE DRAWINGS

A preferred embodiment of the invention will be described with reference to the accompanying drawings, in which.

DETAILED DESCRIPTION OF EMBODIMENTS

The present invention provides load bearing apparatus for use with a light weight vehicle, such as an all terrain vehicle (ATV). While the terms all terrain vehicle and ATV are used herein, it is understood that they are meant to refer to any light vehicle suitable for use with the invention, for example, a riding mower.

The versatile hitching structures of the present invention are constructed in a manner whereby they may be readily mounted upon various sizes of ATVs, riding mowers or any similar single seat engine powered 4 wheel vehicle. These vehicles are desirable for off-the-road use in various weather conditions inasmuch as they are highly maneuverable and afford considerable traction for off road use. The invention provides a load bearing assembly for ATVs which will enable such vehicles to bear much more heavy loads than would normally be possible with a light weight vehicle. The load bearing assembly construction including features thereof adapting it for securement to an associated ATV in a manner such that the loads to be pulled or lifted thereby may be evenly distributed throughout the associated ATV. The load bearing assembly conforms to conventional forms of manufacture and is easy to install so as to provide a device that will be economically feasible, long lasting and relatively trouble free in installation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

Figure 1:
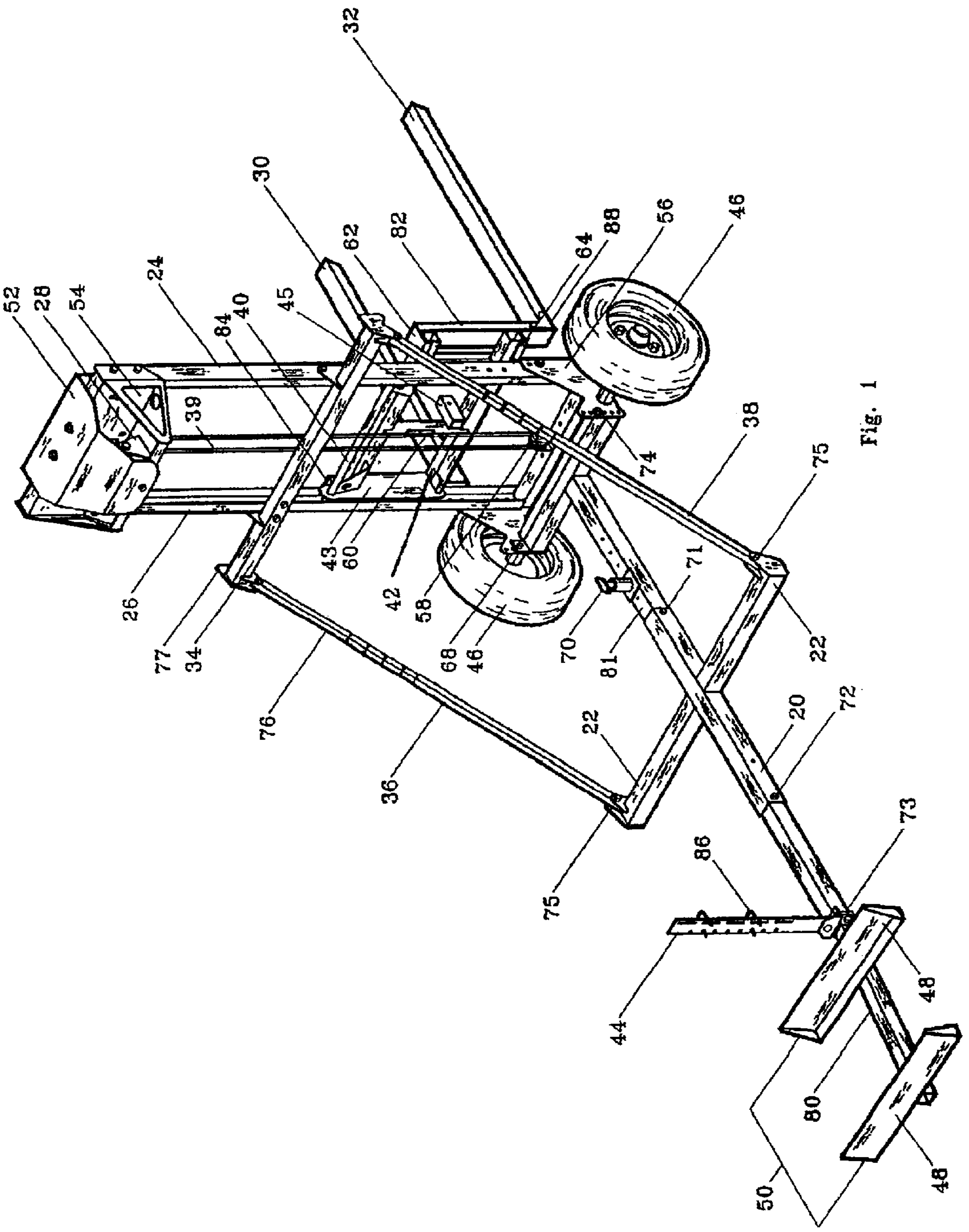
FIG. 1 is a front perspective view of load bearing assembly, forklifts and support structure according to the present invention.
Figure 2:
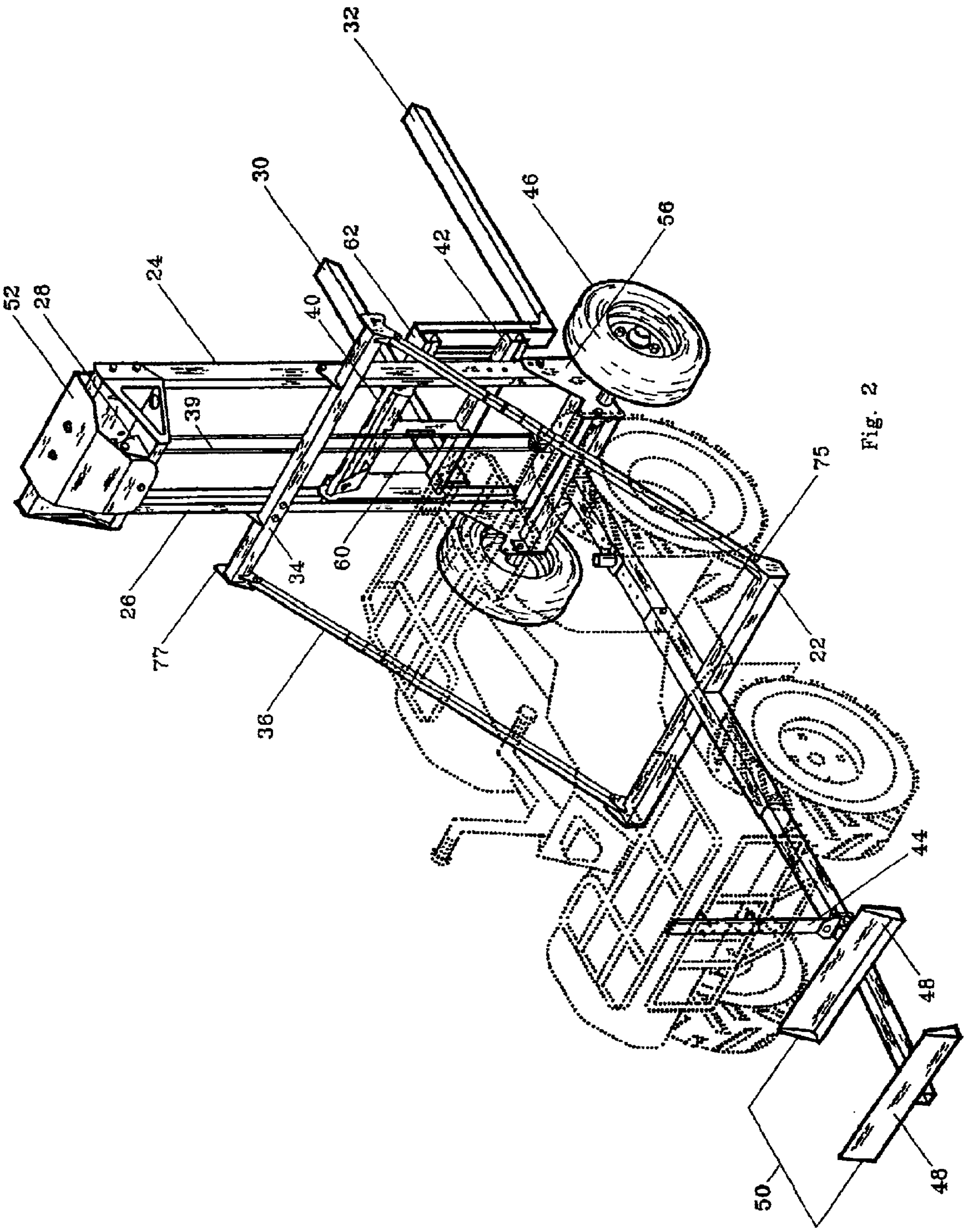
FIG. 2 is a front perspective view of the invention of FIG. 1, secured to an ATV.

As shown in FIG. 1 and FIG. 2, the invention comprises a detachable forklift and associated support structure for use with an ATV. FIG. 1 shows center bar 20 and T-bar 22 for extending under and bolting to the frame of the ATV. The support structure and detachable forklift in use with the ATV is shown in FIG. 2. Masts 24 and 26 support a winch 28 at the rear of the ATV. Winch 28 raises and lowers carrying arms 30 and 32 by means of line 39. Cross member 34 is attached to the masts, and cross member 34 is also attached to truss members 36, 38 which are in turn attached to T-bar 22 to stabilize the apparatus while in use. By the use of truss members 36, 38, the load bearing apparatus of the invention can support greater loads than would otherwise be possible using relatively light duty structure and a relatively light weight vehicle.

Masts 24 and 26 are attached to a mast base 56. Mast base 56 is also attached to axel 68. Axel 68, in turn supports one or more wheels 46. The wheels provide additional support for the load bearing apparatus.

The fork lift has a guide frame which straddles the mast and is provided with rollers or other means to travel on the masts. The guide frame has support members 40 and 42 extending horizontally and attached to side members 43 which extend vertically. In the Figures, only one of the two side members is shown, the other being located behind mast 24. At the center of the guide frame is line grip 60, connected to the support members 40 and 42, and also secured to winch line 39. Winch line 39 is in communication with the winch, which is located near the top of the mast on winch base 54. Near the bottom of the mast is pulley 58, also in communication with line 39. When the winch is in operation, line 39 is moved by the winch, and can either raise or lower the guide frame by its communication with line grip 60.

Winch line 39 may be a chain, cable, or other lines known in the art for use in conjunction with a winch. The winch includes a narrow groove cable pulley or spool so that connecting the winch device centrally of the mast segment positions the rotational plane of the pulley in the center of the post with the result that no side resultant forces will be produced by the cable and no bracing required.

A motor, such as an electric motor is attached to the winch, or, alternatively, a hand crank is used. In the electric motor version shown, the motor actuates the winch that lowers and raises the winch line. Power is provided by an ATV battery and transported over connecting cables from the battery to the electric motor. Operation of the electric motor is controlled by a finger switch. In a preferred embodiment, the winch provides a 2000 pound line pull, using a drum 1¼ inches (shaft), and a sprocket mounted to the shaft. The winch drives using a sprocket and chain. Winch cover 52 protects the winch from rain or other natural elements.

The guide frame is configured to receive various tools and other implements. The embodiment shown in FIGS. 1 and 2, the guide frame receives pallet forks 30 and 32. Arm uprights 82 and 84 of the forks have upper brackets 62 and lower brackets 64. These brackets are configured to slidably attach the forks 30 and 32 to support members 40 and 42. A pin or other lock means, such as a bolt, is releasably received by upper bracket 62 and a corresponding hole in support members 40. This pin thus releasably secures the forks to the guide frame.

Also as seen in FIG. 1 and FIG. 2, configured to extend from the front of the ATV is a counter load bearing mount 50 to further stabilize the apparatus. Counter load bearing mount 50 comprising load braces 48. Load braces 48 are configured to receive, for example, standard paving blocks. Alternatively, load braces 48 can be configured to receive other weights, preferably standard sized weights. Load braces 48 are fixed to load bar 80. Load bar 80 is in turn releasably attached to the load bearing apparatus, and in particular center bar 20. Pin 73 or other joining means, such as a bolt, releasably secures the counter load bearing mount to center bar 20.

Also releasably secured to the front of the load bearing apparatus is front post 44, releasably secured by pin 73. Front post 44 is generally secured to the front of the ATV. The attachment means are formed with a series of apertures that receive threaded fasteners, typically U-type bolts, that are secured to the cross bars or rods of a front rack.

For removal and reattachment of the load bearing apparatus to the ATV, the apparatus is placed on the ground as shown in FIG. 1, with the exception that front post 44 is preferably fixed to the front of the ATV, as shown in FIG. 2, and the counter load bearing mount is detached. The ATV is then driven in reverse over T-bar 22, so that the rear wheels of the ATV are positioned between T-bar 22 and wheels 46 of the load bearing apparatus. Counter load bearing mount 50 is then slid onto center bar 20, and center bar 20 is raised slightly to be adjoined to front post 44 by pin 73. It will be understood that pin 73 may be a pin, bolt, or other detachable securing means known in the art.

The load bearing apparatus may thus be readily released from the ATV by removing pin 73, detaching load bearing mount 50, and driving the ATV forward over the top of T-bar 22, away from load bearing apparatus.

In order to further secure the load bearing apparatus to the ATV, pin 70 may be used to secure the load bearing apparatus to the rear of the ATV, which is commonly provided with a standard hitch. In addition, the ATV can be configured to have lateral members (not shown) configured near the foot rest areas of the ATV for being releasably secured to the lateral ends of the T-bar 22.

The trusses 36 and 38 can be constructed of a rectangular, stationary outer member that receives in sliding engagement a rectangular, telescoping inner member. Truss members 36 and 38 are adjustable in size, or otherwise adjustable, in order to secure the truss members such that the masts 24 and 26 are positioned off of true vertical. For example, the pin 76 can be removed from the two halves of the truss members 36, and the length of the truss members increased or decreased by adjusting the inner truss member in relation to the outer truss member, according to whether or not masts 24 and 26 are to be angled back toward the ATV or forwards away from the ATV. Once the desired angle is achieved, pin 76 can be replaced in one of the series of holes seen in the truss members 36 and 38. In another embodiment, pin 75 can be removed, and the truss member adjusted such that the lateral ends of T-bar 22 are attached to a different point on the lower end of truss members 36 and 38. In another embodiment, pin 77 can be removed, and the upper end of truss members 36 and 38 adjusted so that the lateral ends of cross member 34 attach at a different location on truss members 36 and 38.

Center bar 44 is divided into a plurality of smaller bars with receiving holes 81 located along the center bar. Holes 81 are configured to received pins or other locking means. Thus, the location of hitch pin 70, or the location of the attachment as between various parts of the center bar can be adjusted, by adjusting the relative length of center bar 20 in relation to the ATV. In this way, the present invention can be readily adapted for use with various sizes of ATVs or other small vehicles.

In the embodiment shown in FIG. 1 and FIG. 2, the arm uprights 82 and 84 are welded at joiner 88 to carry arms 30 and 32, to hold the forks in the configuration of a typical forklift.

Figure 9:
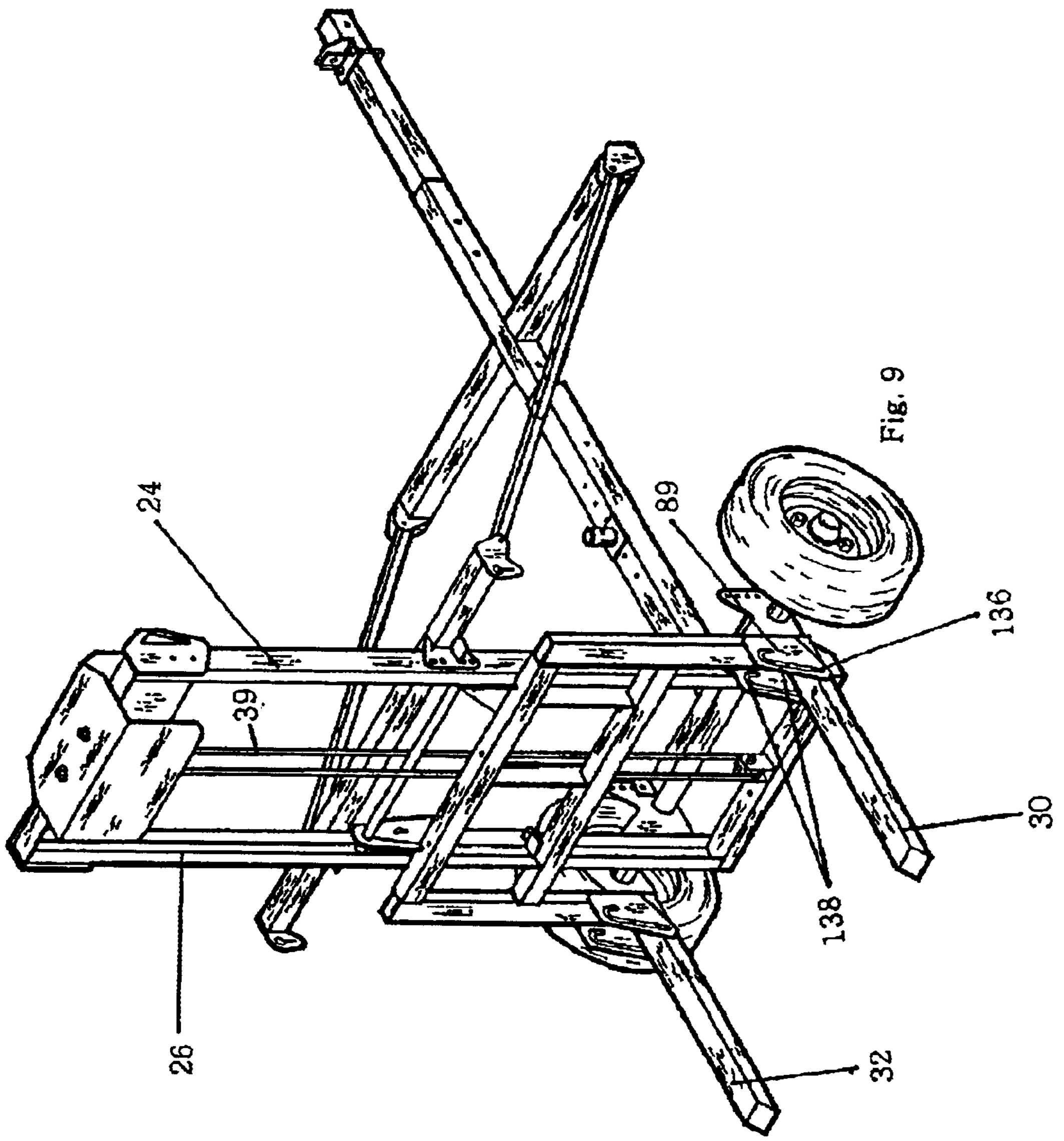
FIG. 9 is a rear perspective view of the load bearing assembly, support structure and hinged carrying arms of the present invention.

In another embodiment, shown in FIG. 9, joiner 89 is equipped with movable hinges 136 which allow carrying arms 30 and 32 to be rotated downwards to horizontal or rotated 90 degrees upwards and folded vertically against the guide frame and locked into place. When carrying arms 30 and 32 are desired for normal use, they are folded downwards, with the hinge 136 allowing rotation until the arms are horizontal as shown in FIG. 9. Joiner 89 has slots 138 configured to receive hinges 136, allowing both rotation of the hinges as well as movement of the hinges along the slots 138. As seen in FIG. 9, slots 138 are formed in the shape of an inverted J. When the hinges are moved over the top bend of the inverted J and into the small part of the inverted letter J, the carrying arms 30 or 32 are held upright and parrallel to the masts 24 and 26. When the hinges are moved over the top of the inverted J and into the large part of the inverted letter J, the carrying arms 30 or 32 are held down and perpendicular to the masts 24 and 26.

Carrying arms 30 and 32 may be removed from support members 40 and 42, and support members 40, 42 can be used to support any one of a hitch, dump bucket, log skidder, pallet forks, backhoe, agricultural plow, folding logging forks, tiller, or disk harrow, as well as any other implement suitable for attachment to a vehicle, as is known in the art.

Figure 3:
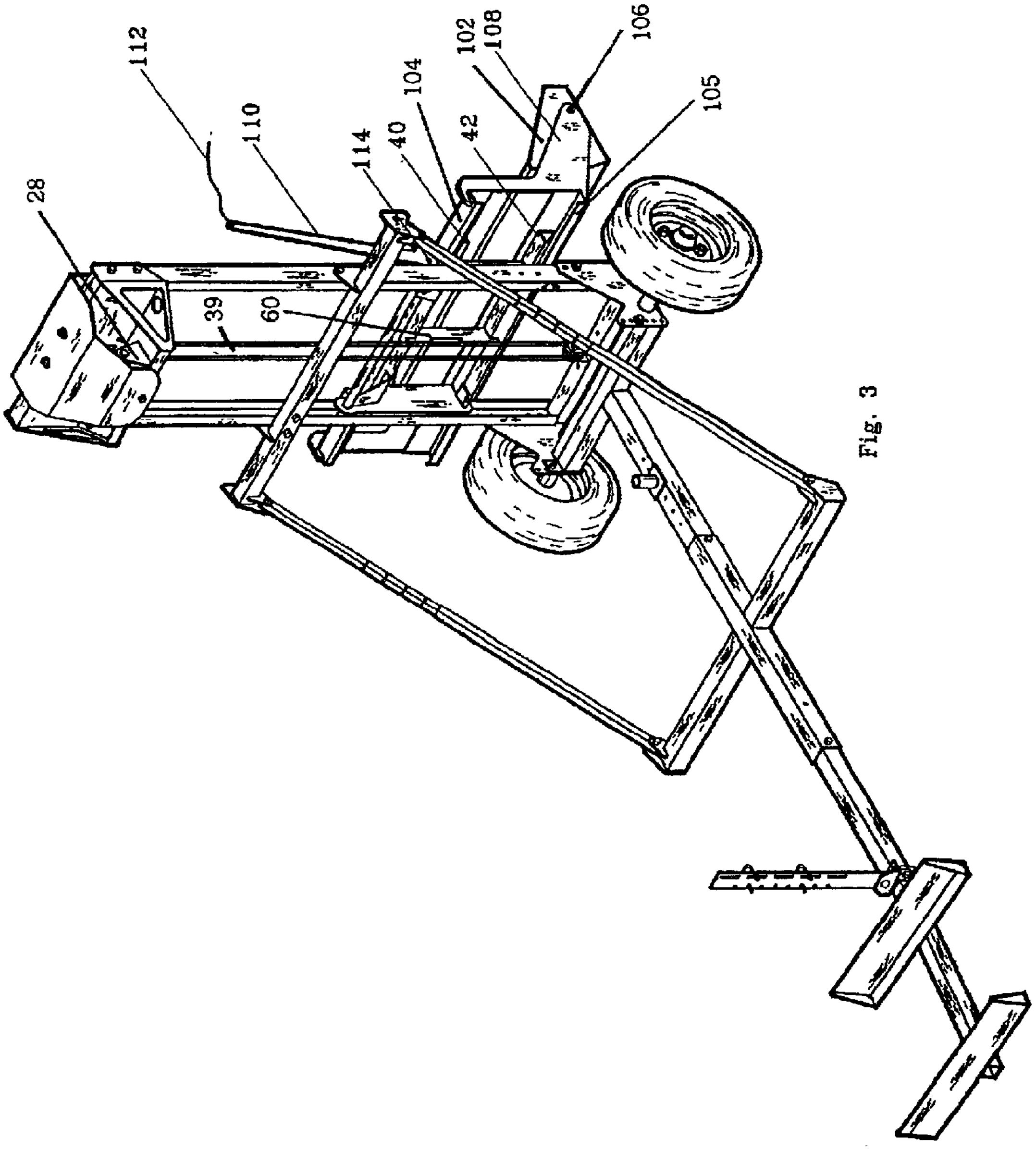
FIG. 3 is a rear perspective view of the load bearing assembly, support structure and dump bucket according to the present invention.

As shown in FIG. 3, the invention further provides a dump bucket 102. Dump bucket 102 is configured with brackets 104 and 105 which can be releasably slid onto the support members 40 and 42, in the manner described above. The dump bucket has a dump bucket hinge 106, which attaches the dump bucket rotationally in relation to the side plates 108. The dump bucket further has a lever 110 to which may be attached a rope, 112. In use, when rope 112 is pulled, it actuates lever 110 which rotates around hinge 114. The opposite side of the lever lifts a chain (not shown) which is attached to both the lever and the bottom inner portion of dump bucket 102. Lifting the chain thus raises the back end of dump bucket 102, rotating dump bucket 102 around hinge 106. In this way, the dump bucket 102 may be emptied of its load.

It will further be appreciated that the dump bucket 102 may be raised and lowered by use of the winch. Similar to the manner described above with respect to the forklift option, activating the winch 28 causes the winch line 39 to raise or lower, thus raising or lowering the line grip 60, which is fixed to the support members 40 and 42, in turn fixed to the dump buck assembly. Thus the dump bucket may be raised and lowered, as well as dumped, similar to a conventional front end loader type bucket.

Figure 4:
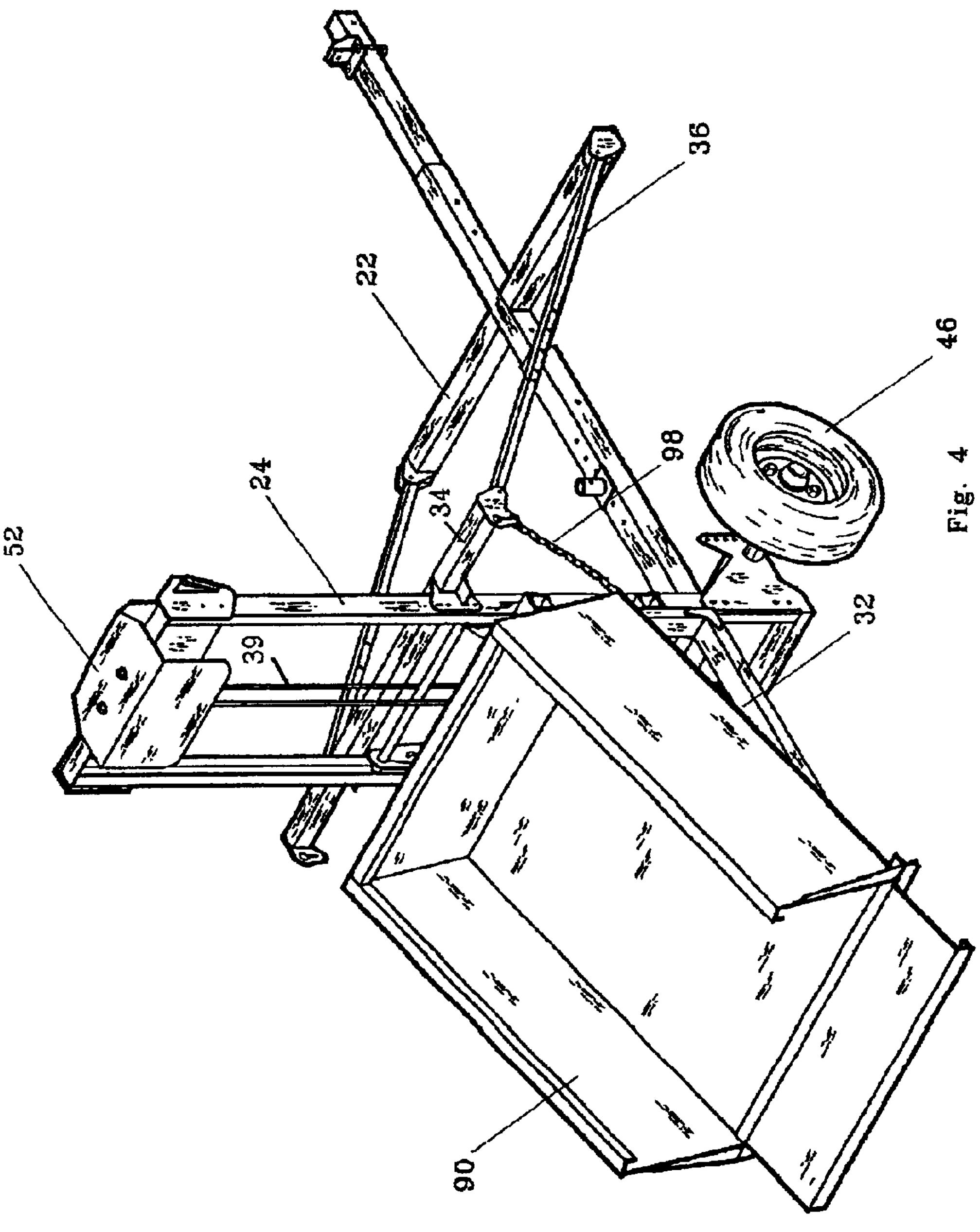
FIG. 4 is a rear perspective view of the load bearing assembly, support structure and dump box according to the present invention.

FIG. 4 shows the invention in use with a dump box 90. For loading, dump box 90 is placed on the carrying arms 30 and 32. Carrying arms 30 and 32 are raised and lowered by normal operation of the carriage guide frame and winch, described above.

At least one chain is releasably attached from cross member 34 to the rear of dump box 90 such that the box is level when the forklifts are in a raised position. When the forks are lowered, and the chain 98 is maintained attached to cross member 34, the front of the dump box is lowered while the rear of the dump box is maintained in an elevated position by chain 98. This allows the dump box to dump its load. Also, by altering chain's attached length between cross member 34 and dump box 90 or by removing chain 98, the dump box can be lowered to ground without dumping. Thus heavy items can be rolled or slid into or out of the dump box.

Figure 5:
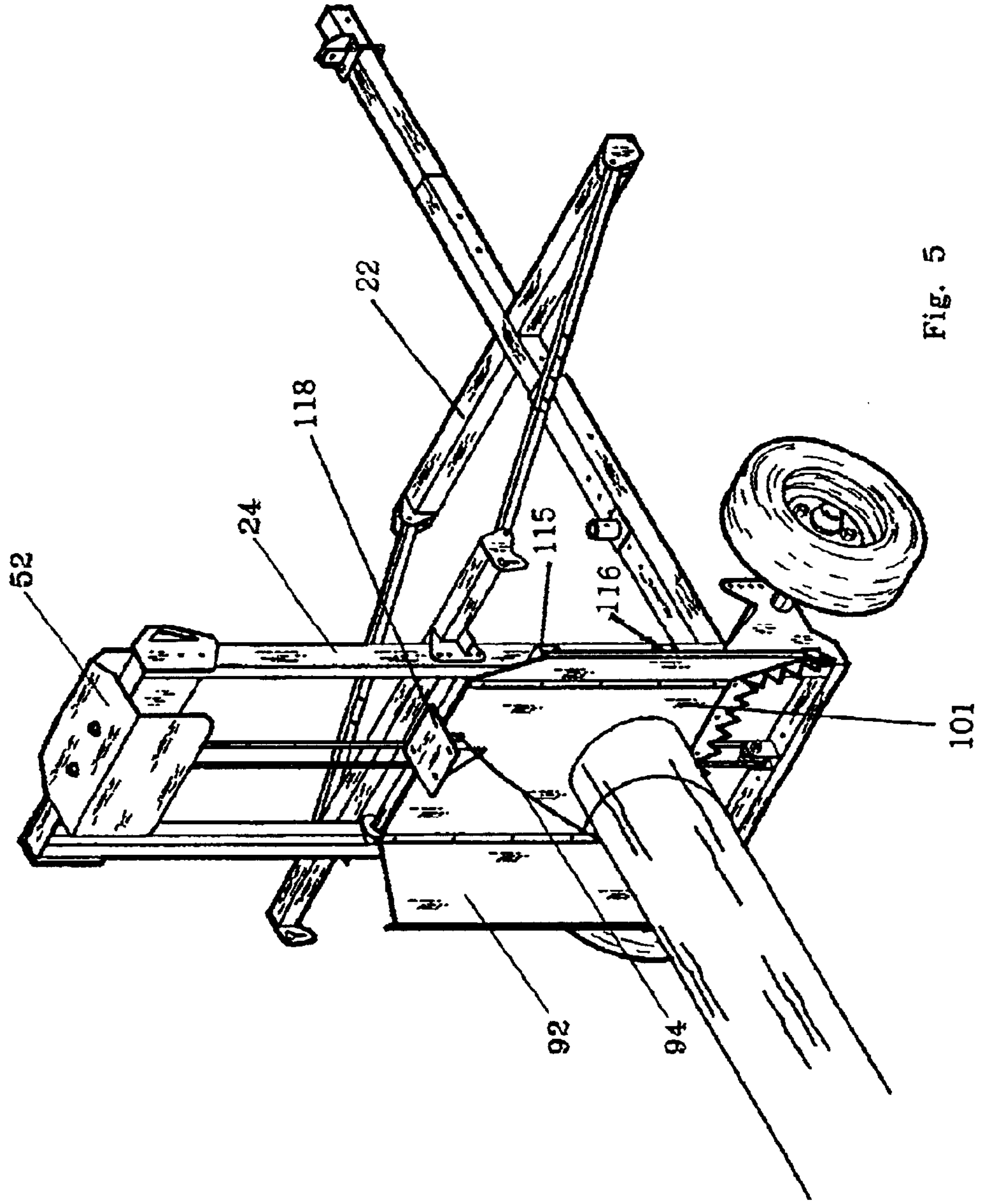
FIG. 5 is a rear perspective view of the load bearing assembly, support structure and log skidder according to the present invention.
Figure 6:
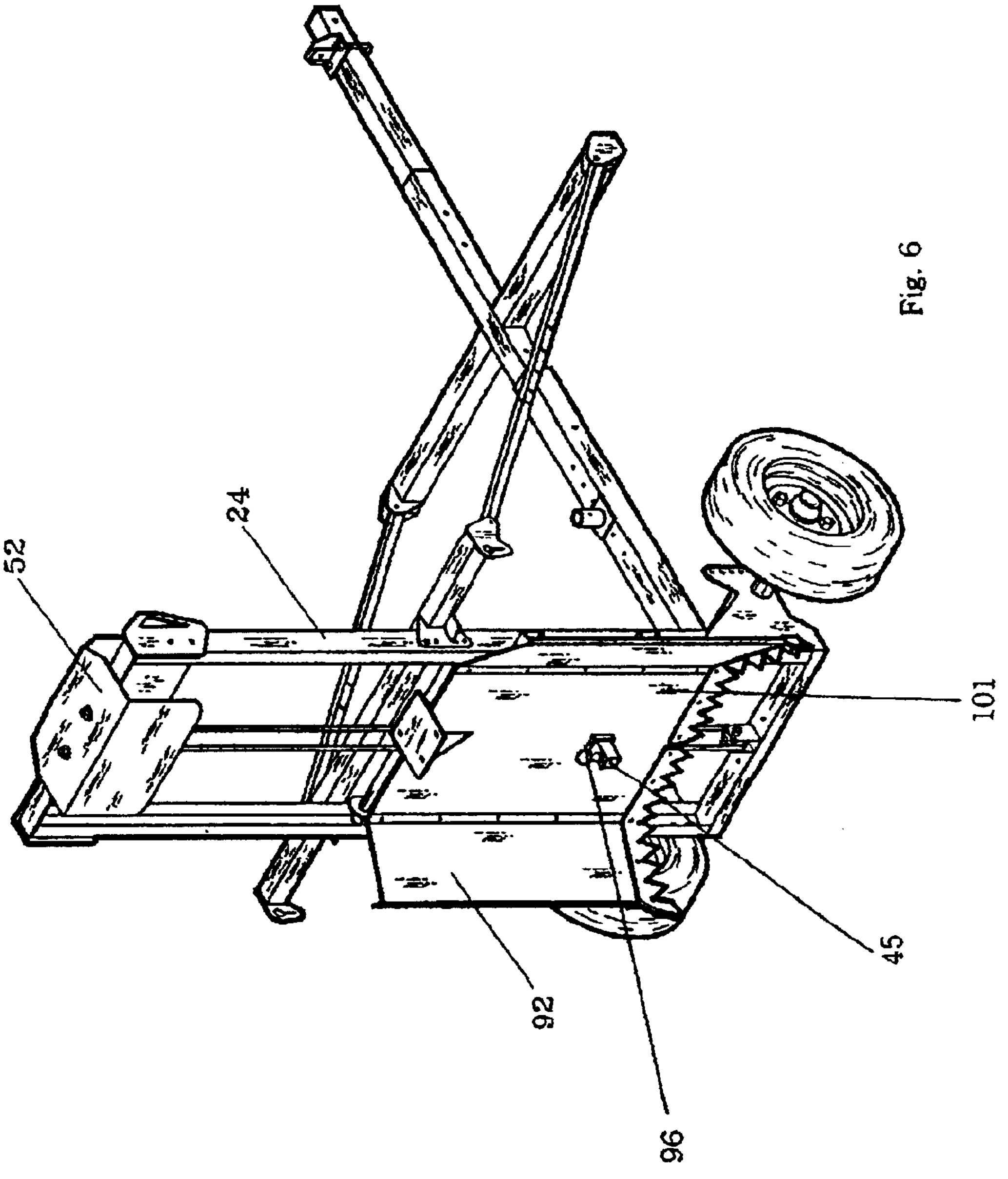
FIG. 6 is a rear perspective view of the log skidder and hitch according to the present invention.

In another embodiment of the invention, as seen in FIG. 5, a skidder 92 may be slidably attached to support members 40 and 42 (not shown—located behind skidder wall 101), by the use of brackets 115 and 116 located on the rear of the skidder, which are configured in a manner similar to that as described above for the forklift arm brackets 62 and 64 (shown in FIG. 1). As shown in FIG. 6, a pin or other joining means, such as a bolt, secures skidder 92 to connecting member 45 which extends through a reciprocal opening in the skidder wall 101. Connecting member 45 is secured to the main apparatus at support member 42, as shown in FIG. 1.

As shown in FIG. 5, chain 94 may be releasably attached to the skidder top 118 to facilitate the hauling of materials such as logs. It will be appreciated that the skidder can be readily raised and lowered, using the winch, in a manner similar to the raising and lowering of the forks, described above.

As shown in FIG. 6, the invention further comprises a towing hitch 96, which can be removably attached to the connecting member 45. The connecting member 45 can be inserted into a corresponding hole in the skidder. As shown in FIG. 1, connecting member is secured to the rear of the load bearing apparatus at support member 42, by use of a pin, bolt, weld, or other conventional means. The invention thus provides a tow hitch which can be raised or lowered in the same manner as described above. This facilitates the lifting of a heavy hitched load.

Figure 7:
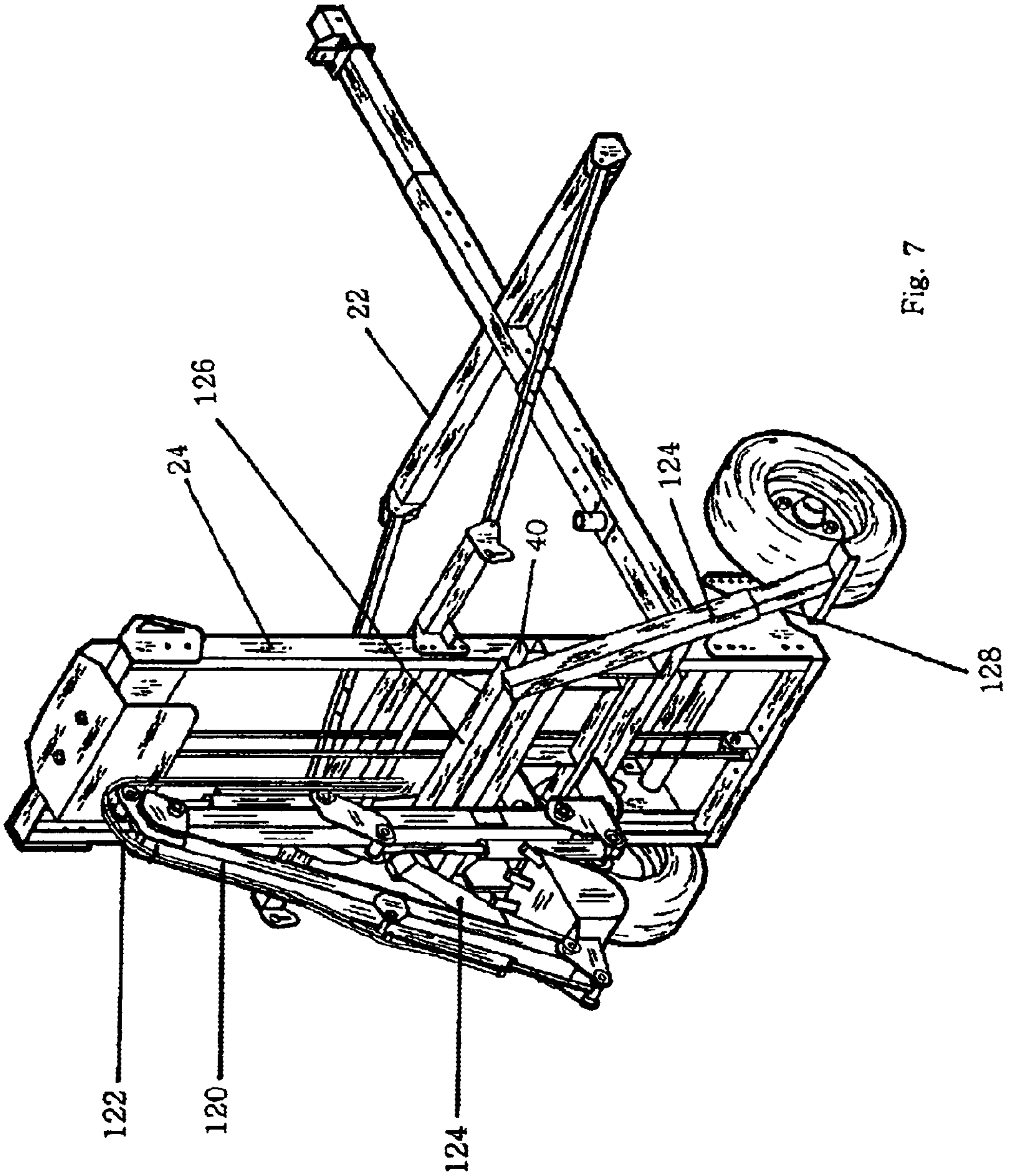
FIG. 7 is a rear perspective view of the load bearing assembly, support structure and back hoe of the present invention.

In another embodiment, as shown in FIG. 7, is provided a backhoe for use with the load bearing assembly. Backhoe 120 is provided with hydraulic lines which, in turn, are attached to a hydraulic line operator and a compressor (not shown). The backhoe may then be operated in a manner of use of a conventional backhoe, with the load bearing assembly of the invention providing the added benefits of (a) distributing the weight and digging and lifting forces of the backhoe to the front and sides of the ATV, and (b) providing winch operation to raise and lower the entire backhoe 120, in the manner described above. While using the backhoe 120, additional stabilization of the entire apparatus is provided by use of stabilizer legs 124.

Backhoe 120 is removably attached to the load bearing assembly by brackets 126 which slide onto support members 40 and 42, and is then secured to the support members by a bolt, pin, or other means known in the art. Backhoe 120 is secured to the brackets 126 by welds or other means. Stabilizer legs 124 are secured to brackets 124 by welding or the like. A lower leg 128 telescopes within leg 124, and can be fixed in place by a bolt, pin, or other releasable means. Thus, stabilizer leg can be adjusted to the size desired for the task at hand.

Figure 8:
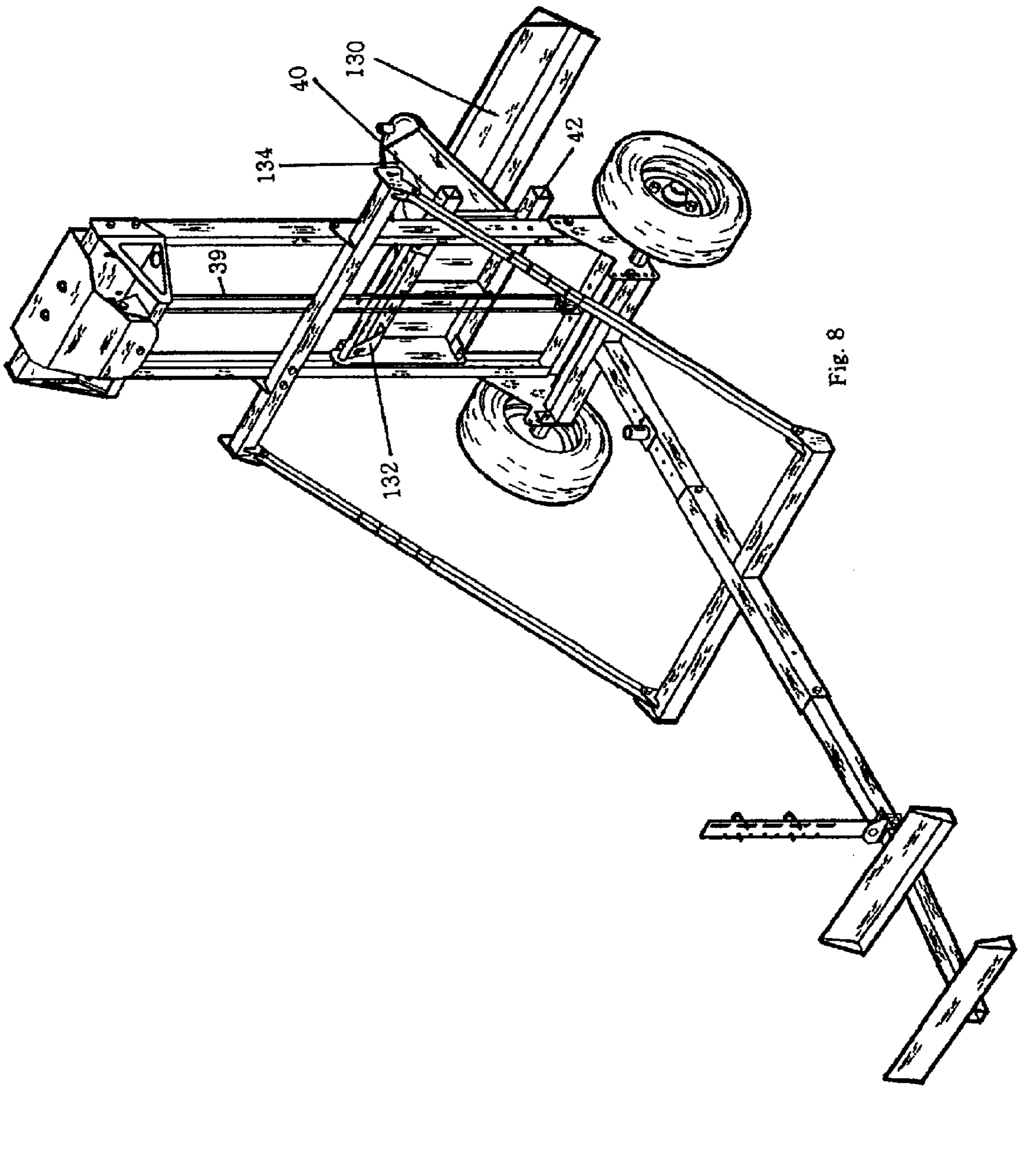
FIG. 8 is a front perspective view of the load bearing assembly, support structure and scraper blade of the present invention.

In another embodiment, as shown in FIG. 8, is provided a scraper blade 130 for use with the load bearing assembly. Scraper blade 130 is removably attached to the load bearing assembly by brackets 132 which slide onto support members 40 and 42, and is then secured to the support members by a bolt, pin, or other means known in the art. Plate 134 is secured to the brackets 132 by welds or other means. Scraper blade 130 is, in turn, secured to plate 134. Preferably, scraper blade 130 is attached to plate 134 such that the angle of scraper blade 130 relative to the load bearing assembly is readily adjustable, and can be set to the desired angle for a given job.

It will be understood that the winch provides the benefit of being able to apply down pressure to the various implements. For example, one can use the scraper blade or a front end loader type bucket, with down pressure applied by the winch, to provide more powerful operation.

The invention may also be used in association with other implements including: scraper blade, agricultural plow, folding logging forks, tiller, disk harrow, hydraulic hammers, augers, grinders, and grapples.

The various constituent parts of the device can be manufactured of material that possesses characteristics appropriate for the intended duty, i.e. high strength, rigidity, light weight, and attractive appearance with aluminum, steel, and various composite materials offering the most feasible choices.

It is to be understood that only the preferred embodiments have been shown, and that modifications thereof would be readily apparent to one skilled in the art. Therefore, the true scope and spirit of the invention resides in the appended claims and their legal equivalents, rather than by the given examples.

We claim:

1. A support structure for a load bearing apparatus for a light vehicle, comprising:

a) a mast extending upwards;

b) a center bar extending horizontally from said mast, said center bar configured to extend along the bottom of said light vehicle;

c) a T bar extending from said center bar, along the bottom of said light vehicle to a T bar end at a lateral side of said light vehicle; and d) a first truss member extending upwards on an incline from said first T bar end to a truss position on said mast.

2. A support structure as claimed in claim 1, wherein:

said mast comprises a first mast post and a second mast post;

said T bar further has a second T bar end at an opposite lateral side opposite said lateral side of said light vehicle; and said first truss member extends upwards on an incline from said first T bar end to said first mast post and a second truss member extends upwards on an incline from a second T bar end to said second mast post.

3. A support structure as claimed in claim 1 wherein said mast further comprises at least one wheel or other weight-bearing support mechanism at the bottom of said mast.

4. A support structure as claimed in claim 1 wherein said mast is pivotable in relation to said center bar and wherein at least one end of said first truss member is releasably attachable to more than one location such that said mast may be secured to said T bar at more than one angle in relation to said center bar.

5. A support structure as claimed in claim 1 wherein said mast is pivotable in relation to said center bar and wherein said first truss member comprises a first truss part and a second truss part, and said first truss part releasably attachable at more than one position in relation to said second truss part, such that said mast may be secured to said T bar at more than one angle in relation to said center bar.

6. A support structure as claimed in claim 1 wherein said mast is configured for positioning at a first end of said vehicle and said center bar extends from said mast to a second end of said vehicle and said center bar is configured to be releasably secured to said second end of said vehicle.

7. A support structure as claimed in claim 6, further comprising a counter load bearing mount attached to said center bar at said second end of said vehicle.

8. A support structure as claimed in claim 6 wherein said first end of said vehicle is a rear of said vehicle.

9. A support structure as claimed in claim 6 wherein said first end of said vehicle is a front of said vehicle.

10. A load bearing apparatus comprising a winch and a support structure as claimed in claim 1.

11. A load bearing apparatus comprising a support structure as claimed in claim 1 and at least one support member secured in a relation substantially perpendicular to said mast and slidable in parallel relation to said mast, a winch and a winch line, and wherein said at least one support member is secured to said winch line such that said operation of said winch moves said at least one support member in parallel relation to said mast.

12. A load bearing apparatus comprising a support structure as claimed in claim 1 and at least one load bearing member selected from the group consisting of a dump box, 3-point hitch, hitch, dump bucket, log skidder, pallet forks, backhoe, agricultural plow, folding forks, tiller, scraper, disk harrow, disk harrow, hydraulic hammer, auger, grinder, and grapples.

13. A load bearing apparatus as claimed in claim 12, further comprising at least one support member secured in a relation substantially perpendicular to said mast, and wherein said load bearing member is releasably attachable to said support member.

14. A support structure for a load bearing apparatus for a light vehicle, comprising:

a) a mast configured for positioning at a first end of said vehicle and extending upwards;

b) a center bar extending horizontally from said mast, said center bar configured to extend along the bottom of said light vehicle to a second end of said vehicle and said center bar is configured to be releasably secured to said second end of said vehicle; and c) a load bearing apparatus attached to said center bar at said second end of said vehicle.

15. A support structure as claimed in claim 14 wherein said load bearing apparatus is selected from the group consisting of a dump box, 3-point hitch, hitch, dump bucket, log skidder, pallet forks, backhoe, agricultural plow, folding forks, tiller, scraper, disk harrow, disk harrow, hydraulic hammer, auger, grinder, and grapples.

16. A support structure as claimed in claim 14, further comprising a truss member extending from substantially a bottom of said all terrain vehicle upwards to said mast.

* * * * *